US012759540B2

(12) United States Patent
Horiguchi

(10) Patent No.: US 12,759,540 B2
(45) Date of Patent: Oct. 13, 2026

(54) DRIVER ASSISTANCE APPARATUS

(71) Applicant: SUBARU CORPORATION, Tokyo (JP)

(72) Inventor: Harunobu Horiguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 69 days.

(21) Appl. No.: 18/611,855

(22) Filed: Mar. 21, 2024

(65) Prior Publication Data

US 2024/0326788 A1 Oct. 3, 2024

(30) Foreign Application Priority Data

Mar. 30, 2023 (JP) ................................ 2023-055395

(51) Int. Cl.
*B60W 30/09* (2012.01)
*B60Q 9/00* (2006.01)
*G06V 20/56* (2022.01)

(52) U.S. Cl.
CPC ............ *B60W 30/09* (2013.01); *B60Q 9/008* (2013.01); *G06V 20/56* (2022.01); *B60W 2420/403* (2013.01); *B60W 2510/0657* (2013.01); *B60W 2520/06* (2013.01); *B60W 2555/20* (2020.02)

(58) Field of Classification Search
CPC .. B60W 50/14; B60W 30/09; B60W 2520/06; B60W 2420/403; B60W 2510/0657; B60W 60/00182; B60Q 9/008; G06V 20/56
See application file for complete search history.

(56) References Cited

U.S. PATENT DOCUMENTS

| | | | | |
|---|---|---|---|---|
| 2015/0042491 A1* | 2/2015 | Burnison | ............... | B60Q 9/008 340/902 |
| 2018/0265097 A1* | 9/2018 | Suzuki | .................. | B60W 30/12 |
| 2020/0156538 A1* | 5/2020 | Harper | .................... | G10K 11/34 |
| 2021/0023987 A1* | 1/2021 | Bader | ................... | G01S 13/931 |
| 2021/0070288 A1* | 3/2021 | Yamaoka | ............. | G06V 20/588 |
| 2023/0419837 A1* | 12/2023 | Kato | ...................... | G08G 1/164 |
| 2025/0010719 A1* | 1/2025 | Yahata | ..................... | G08G 1/16 |

FOREIGN PATENT DOCUMENTS

JP 2007-245970 A 9/2007

* cited by examiner

*Primary Examiner* — Tarek Elarabi
(74) *Attorney, Agent, or Firm* — Rimon P.C.

(57) ABSTRACT

A driver assistance apparatus includes an environment information obtainer, a visibility value measurer, and a control processor. The environment information obtainer acquires information on a traveling environment around a vehicle. The visibility value measurer measures a visibility value of the vehicle in the traveling environment based on the information on the traveling environment. The control processor determines whether visibility obstruction has occurred based on the visibility value and, when determining that the visibility obstruction has occurred, executes a driver assistance mode against the visibility obstruction. When determining that the visibility obstruction has occurred, the control processor executes one or both of a first process adapted to notify surrounding objects present around the vehicle of the presence of the vehicle depending on the visibility value, and a second process adapted to assist a traveling state of the vehicle.

12 Claims, 7 Drawing Sheets

DRIVER ASSISTANCE APPARATUS

CROSS-REFERENCE TO RELATED APPLICATIONS

The present application claims priority from Japanese Patent Application No. 2023-055395 filed on Mar. 30, 2023, the entire contents of which are hereby incorporated by reference.

BACKGROUND

The disclosure relates to a driver assistance apparatus to be applied to a vehicle.

An existing driver assistance apparatus is known which is configured to set a traveling route from a current position to a destination when a driver or an operator of a vehicle sets the destination, and control a part or the entire driving operation on behalf of the driver. According to the existing driver assistance apparatus, the driver assistance control is cancelled when it is determined that it is difficult to maintain the driver assistance control due to visibility obstruction caused by a snowfall, a snowstorm, or the like, following which the driving of the vehicle is taken over by the driver.

When being forced to take over the driving of the vehicle after the driver assistance control by the driver assistance apparatus is cancelled due to the visibility obstruction, the driver has to make other vehicles traveling near the vehicle recognize the presence of the vehicle.

When being forced to take over the driving of the vehicle in an environment where the visibility obstruction occurs, the driver has to perform a steering operation or an acceleration operation with focusing his/her attention on a front environment ahead of the vehicle. Being concentrated on the front environment, the driver is likely to forget to perform an operation to make the other vehicles recognize the presence of the vehicle.

For example, according to a technique disclosed in Japanese Unexamined Patent Application Publication (JP-A) No. 2007-245970, a control device notifies a driver of visibility hindrance or visibility obstruction when detecting the visibility hindrance or visibility obstruction. In addition, the control device urges the driver to turn on a lighting device of an own vehicle or causes the lighting device to automatically turn on in order to actively notify the other vehicles present around the own vehicle of the presence of the own vehicle.

SUMMARY

An aspect of the disclosure provides a driver assistance apparatus to be applied to a vehicle. The driver assistance apparatus includes an environment information obtainer, a visibility value measurer, and a control processor. The environment information obtainer is configured to acquire information on a traveling environment around the vehicle. The visibility value measurer is configured to measure a visibility value of the vehicle in the traveling environment based on the information on the traveling environment acquired by the environment information obtainer. The control processor is configured to determine whether visibility obstruction to a driver who drives the vehicle has occurred based on the visibility value measured by the visibility value measurer and execute a driver assistance mode against visibility obstruction when determining that the visibility obstruction has occurred. The control processor is configured to execute one or both of a first process and a second process that are set as the driver assistance mode against the visibility obstruction when determining that the visibility obstruction has occurred. The first process is a process adapted to notify surrounding objects present around the vehicle of presence of the vehicle depending on the visibility value. The second process is a process adapted to assist a traveling state of the vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
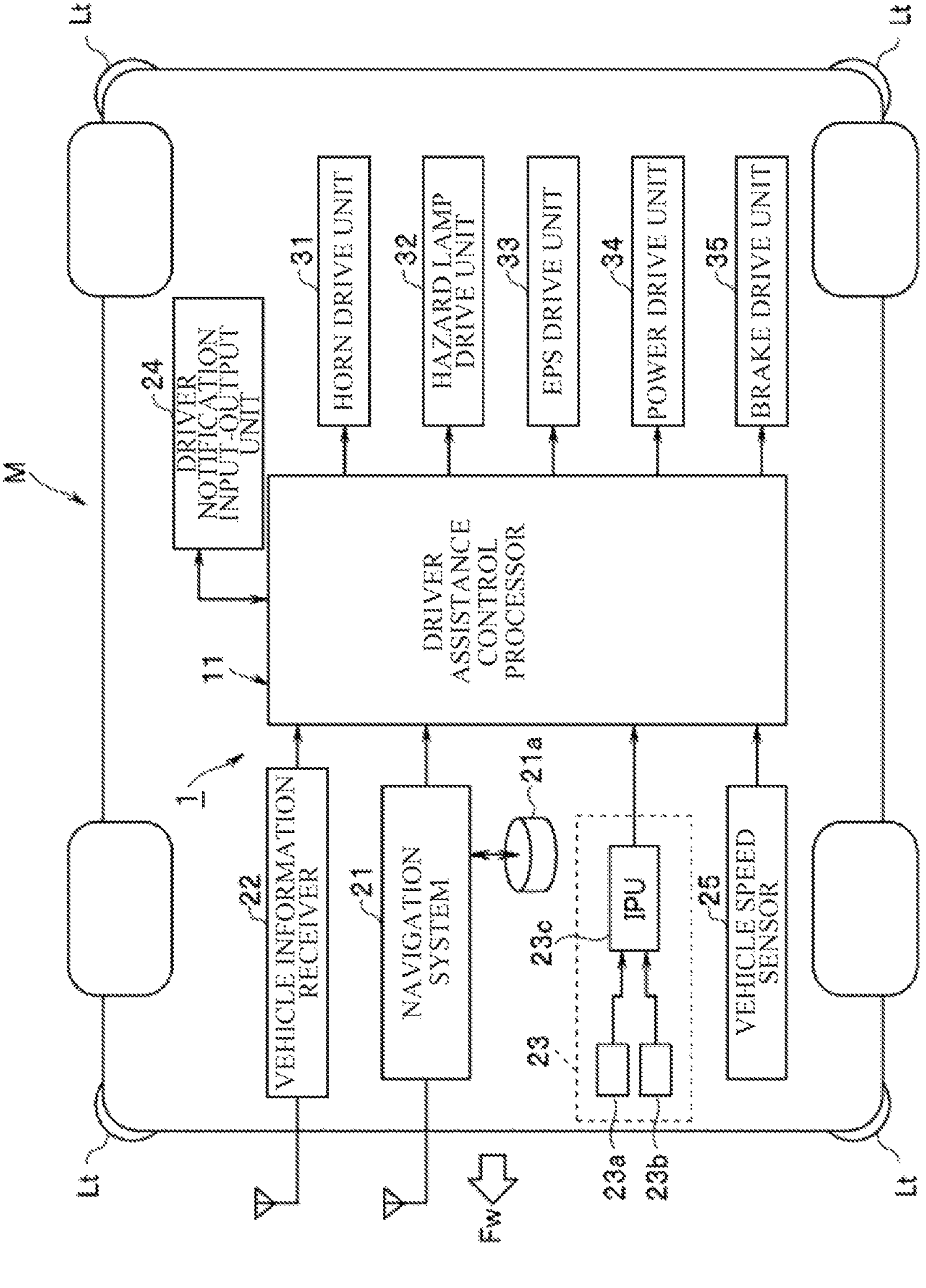
FIG. 1 is a block diagram schematically illustrating an exemplary configuration of a driver assistance apparatus according to one example embodiment of the disclosure.

According to a technique disclosed in JP-A No. 2007-245970, a control device calculates a vehicle recognition rate of another vehicle based on an image captured by a camera. When the vehicle recognition rate is less than or equal to a predetermined reference recognition rate, it is determined that visibility hindrance has occurred. It is therefore difficult for the control device to detect the visibility obstruction when no other vehicle traveling near an own vehicle is recognized from the image captured by the camera due to significant visibility obstruction. As a result, it is difficult for the control device to conduct effective driver assistance control of the own vehicle.

Further, according to the technique disclosed in JP-A No. 2007-245970, the control device turns on a lighting device when it is determined that the visibility hindrance or visibility obstruction has occurred. However, it is difficult to make the other vehicles recognize the presence of the own vehicle by simply turning on the lighting device when significant visibility hindrance has occurred.

It is desirable to provide a driver assistance apparatus that makes it possible to execute effective driver assistance control even when visibility obstruction has occurred, and that makes it possible to make other vehicles present around an own vehicle easily recognize the presence of the own vehicle depending on the degree of the visibility obstruction.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings. The example embodiment described below explains an example in which the subject vehicle travels on a road where drivers keep to the left by law. Needless to say, if the example is to be applied to a road where drivers keep to the right by law, left and right settings or the like may be appropriately set in an opposite manner.

As illustrated in FIG. 1, a driver assistance apparatus 1 mounted on an own vehicle M includes a driver assistance control processor 11 that executes driver assistance control in which a vehicle speed and steering of the own vehicle are controlled, for example. The driver assistance control processor 11 may be a microcontroller that includes a CPU, a RAM, a ROM, a rewritable non-volatile memory such as a flash memory or an EEPROM, and a peripheral device. In the ROM, a program adapted to cause the CPU to execute various processes and fixed data may be stored, for example. The RAM may be provided as a work area of the CPU, and may temporarily store various kinds of data to be used by the CPU. Note that the CPU may be also referred to as a micro-processing unit (MPU) or a processor. In place of the CPU, a graphics processing unit (GPU) or a graph streaming processor (GSP) may be used. Alternatively, a CPU, a GPU, and a GSP may be used in selective combination. In one embodiment, the driver assistance control processor 11 may serve as a "control processor".

The driver assistance control processor 11 may perform active lane keep bouncing (ALKB) control and adaptive cruise control (ACC), for example. The driver assistance control processor 11 may control some driving operations on behalf of a driver who drives the own vehicle M. In a case where the driver assistance control processor 11 is configured to perform automated driving, the driver assistance control processor 11 may perform some or all of the driving operations on behalf of the driver to cause the own vehicle M to automatically travel along a traveling route from a current location to a destination.

When the visibility obstruction or visibility hindrance is detected while the own vehicle M is traveling, the driver assistance control processor 11 executes a driver assistance mode against visibility obstruction. In the example embodiment, a surrounding notification process adapted to notify other vehicles present around the own vehicle M of the presence of the own vehicle M and a traveling assistance process adapted to assist the travel of the own vehicle M on behalf of the driver are set as the driver assistance mode against visibility obstruction. These processes will be described in detail later. The term "visibility obstruction" or "visibility hindrance" used herein may refer to a situation where it is difficult to visually recognize the surrounding scenery due to a snowfall or snowstorm. Note that, in the example embodiment, it is determined that the visibility obstruction has occurred when the visibility is less than or equal to 200 meters.

To an input side of the driver assistance control processor 11, a navigation system 21, a vehicle information receiver 22, a camera unit 23, a driver notification input-output unit 24, and a vehicle speed sensor 25 may be coupled, for example. In one embodiment, the camera unit 23 may serve as an "environment information obtainer". The vehicle speed sensor 25 may detect a vehicle speed of the own vehicle M (hereinafter referred to as an own vehicle speed).

The navigation system 21 may include a ranging electric wave receiver. Based on positional signals sent from positioning satellites of a satellite system such as the global navigation satellite system (GNSS) to the ranging electric wave receiver, the driver assistance control processor 11 may acquire data on a position (i.e., coordinates indicating a latitude, a longitude, and an altitude) of the own vehicle M. The driver assistance control processor 11 may overlay the traveling route to the destination set by the driver on high-resolution road map data (a dynamic map) stored in a high-resolution road map database 21*a*, and may locate the current position of the own vehicle M at the coordinates of the acquired position of the own vehicle M.

The road map data may include static map data and dynamic map data that are used to cause the own vehicle M to travel along the traveling route. Examples of the static map data may include data on the shapes of roads and structures, and data on lanes. Examples of the dynamic map data may include snowfall information or weather information regarding each road that changes over time. The dynamic map data may be sequentially updated and overlaid on the static map data.

The vehicle information receiver 22 may receive information on the other vehicles present around the own vehicle M via a receiving antenna using inter-vehicular communication or road-to-vehicle communication, for example.

The camera unit 23 may include a stereo camera and an image processing unit (IPU) 23*c*. The stereo camera may include a main camera 23*a* and a sub-camera 23*b* each including a CCD or a CMOS as an imaging device, for example. The IPU 23*c* of the camera unit 23 may conduct predetermined image processing on data on a front environment ahead of the own vehicle M acquired by the main camera 23*a* and the sub-camera 23*b*, and may send the processed data to the driver assistance control processor 11.

The driver notification input-output unit 24 may include a monitor and a speaker provided in the navigation system 21 and a touch panel provided on the monitor, for example. When the visibility obstruction is detected, the driver assistance control processor 11 may drive the driver notification input-output unit 24 to notify the driver of a transition to the driver assistance mode against visibility obstruction.

To an output side of the driver assistance control processor 11, a horn drive unit 31, a hazard lamp drive unit 32, an electronic power steering (EPS) drive unit 33, a power drive unit 34, and a brake drive unit 35 may be coupled.

The horn drive unit 31 may set a horn sound pressure level that is variable depending on a visibility value upon the occurrence of visibility obstruction, which is to be described later. The hazard lamp drive unit 32 may be provided on each of a right-front side, a left-front side, a right-rear side, and a left-rear side of the own vehicle M. The hazard lamp drive unit 32 may set the number of cycles of flashing a turn signal lamp Lt per minute (hereinafter referred to as flashing cycle time) that is variable depending on the visibility value upon the occurrence of the visibility obstruction. The EPS drive unit 33 may drive an electronic power steering (EPS). The power drive unit 34 may control driving of a power unit such as an engine or an electric motor. The brake drive unit 35 may control a brake hydraulic pressure to be fed to a brake unit to generate a braking force.

When the driver inputs a destination to the navigation system 21, the navigation system 21 may set a traveling route from the current position of the own vehicle M to the destination on the road map, and may send the information on the traveling route to the driver assistance control processor 11. The driver assistance control processor 11 may start driving assistance control to cause the own vehicle M to travel along the traveling route acquired from the navigation system 21, i.e., the ALKB control and the ACC, or automated driving control.

Based on the image of the front environment ahead of the own vehicle M captured by the camera unit 23 while the own vehicle M is traveling, the driver assistance control processor 11 may determine a visibility value Le which is a visibility distance. For example, the driver assistance control processor 11 may extract portions of the image captured by the camera unit 23 each having a contrast difference greater than or equal to a predetermined value, and may calculate the distance to each extracted portion. Thereafter, the driver assistance control processor 11 may determine the longest distance to be the visibility value Le. Accordingly, the visibility value Le may be a distance remote from the own vehicle M when it is sunny, whereas the visibility value Le may be a distance close to the own vehicle M in a poor visibility condition due to a snowfall or snowstorm.

In the example embodiment, the driver assistance control processor 11 determines, based on the visibility value Le, whether visibility obstruction has occurred. If it is determined that the visibility obstruction has occurred, the driver assistance control processor 11 performs the surrounding notification process adapted to notify the other vehicles present around the own vehicle M of the presence of the own vehicle M and the traveling assistance process adapted to assist the travel of the own vehicle M.

Figure 2:
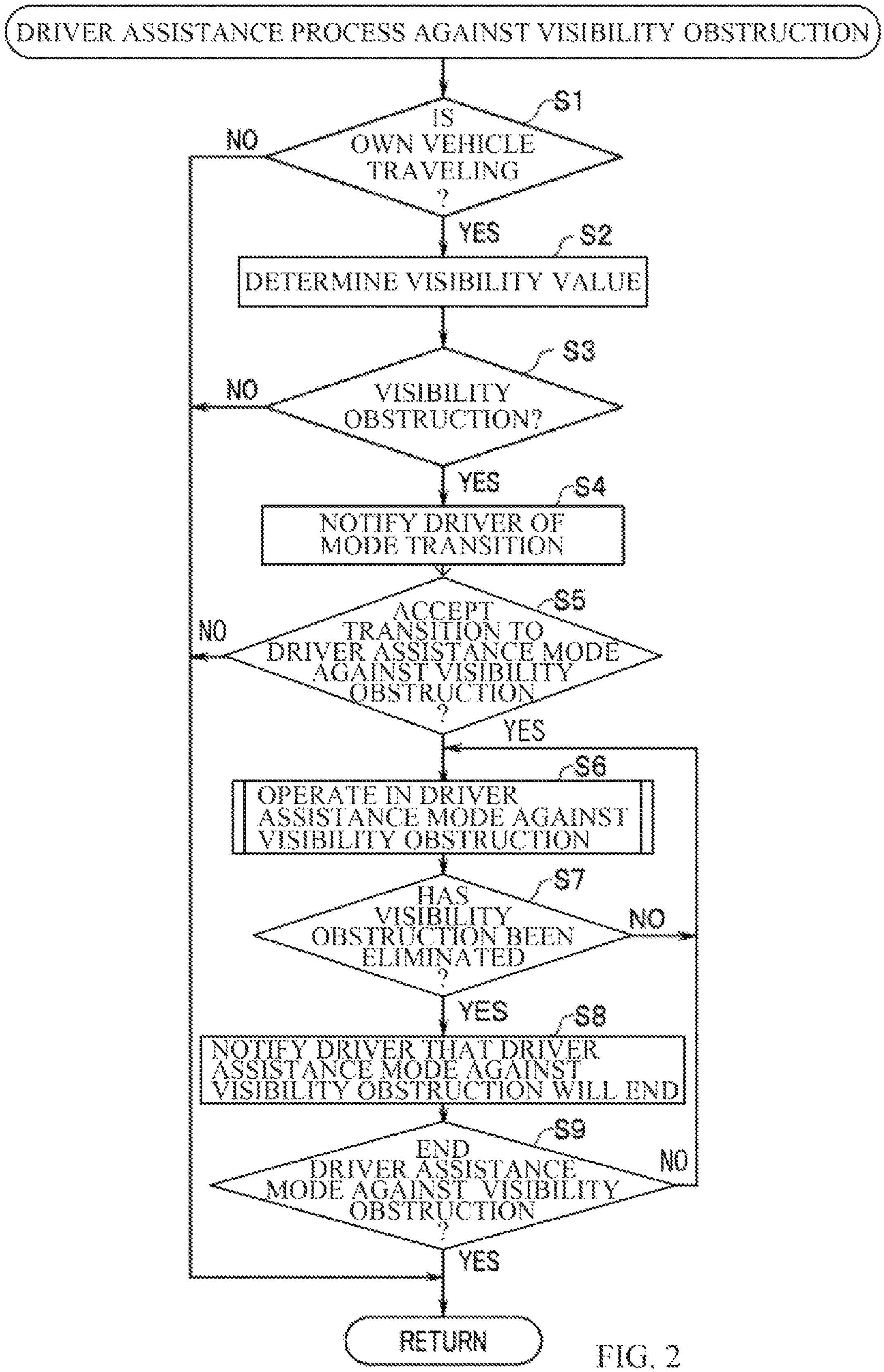
FIG. 2 is a flowchart of a routine of a driver assistance process against visibility obstruction according to one example embodiment of the disclosure.

The driver assistance control processor 11 may execute a driver assistance process against visibility obstruction according to a routine illustrated in FIG. 2, for example.

First, the driver assistance control processor 11 may determine whether the own vehicle M is now traveling based on a vehicle speed V detected by the vehicle speed sensor 25 (Step S1). When the own vehicle M is traveling (i.e., V>0 holds true) (Step S1: YES), the flow may proceed to Step S2. In contrast, when the own vehicle M is stopped (i.e., V=0 holds true) (Step S1: NO), the flow may exit the routine.

Thereafter, the driver assistance control processor 11 may determine the visibility value Le based on the image captured by the camera unit 23 (Step S2). The driver assistance control processor 11 may extract the portions of the image captured by the camera unit 23 each having a contrast difference greater than or equal to the predetermined value, and may calculate the distance to each extracted portion. The driver assistance control processor 11 may determine the longest distance to be the visibility value Le. The process at Step S2 may correspond to a process performed by a visibility value measurer according to one embodiment of the disclosure.

Figure 8:
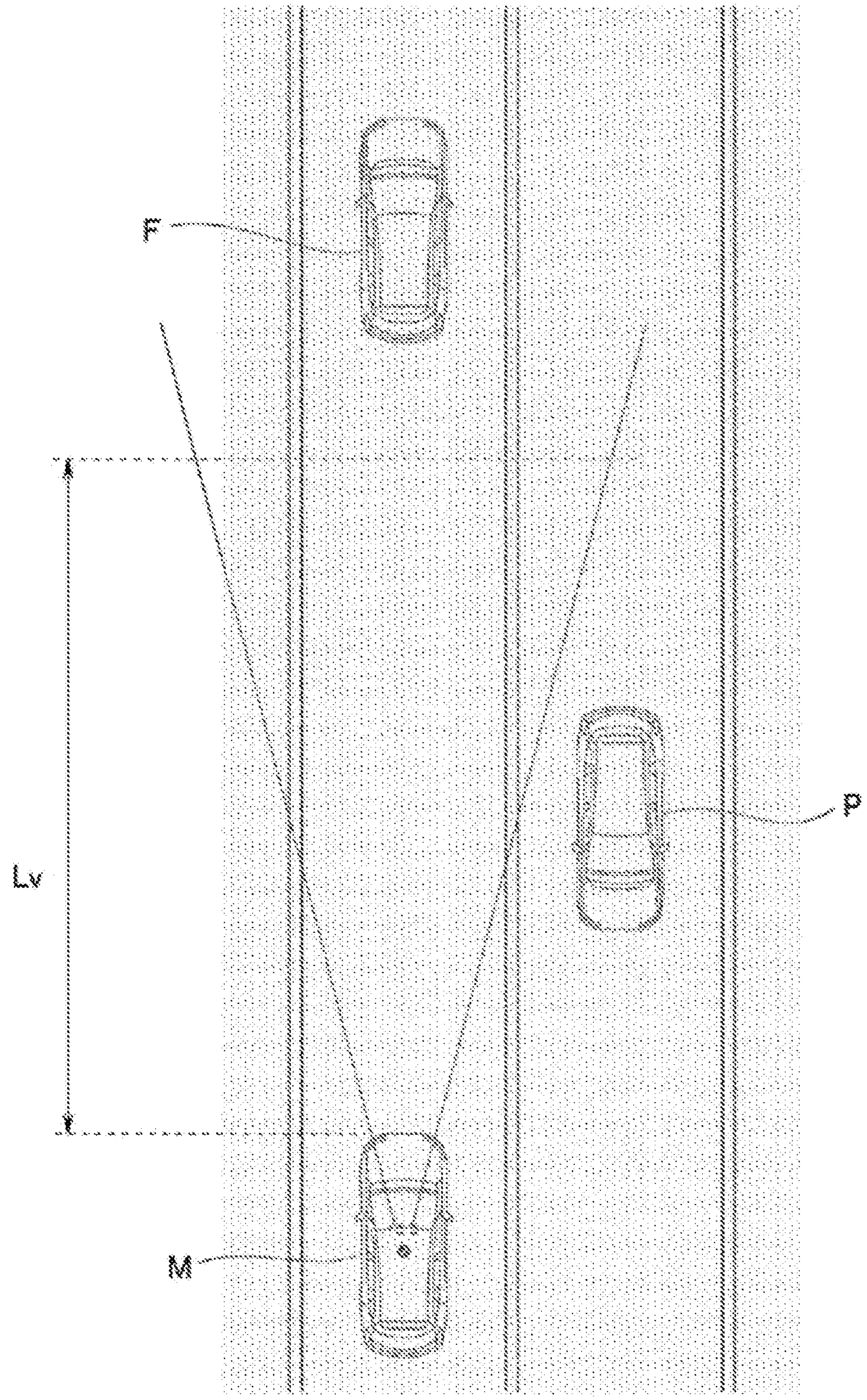
FIG. 8 is an explanatory diagram illustrating a traveling state of a vehicle in an environment where visibility obstruction occurs according to one example embodiment of the disclosure.

When the own vehicle M travels in a snowfall, snowstorm, or fog as illustrated in FIG. 8, for example, the driver assistance control processor 11 may detect a contrast difference between a snow surface of a road and a wheel track on the road, a contrast difference between a road surface and a lane dividing line, and a contrast difference between a three-dimensional object and the surroundings of the three-dimensional object, for example. The driver assistance control processor 11 may extract the portions each having the contrast difference greater than or equal to the predetermined value, and may calculate the distance to each extracted portion. The driver assistance control processor 11 may determine the longest distance to be the visibility value Le. Note that a vehicle denoted by a reference character F in FIG. 8 is a preceding vehicle, and a vehicle denoted by a reference character P in FIG. 8 is an oncoming vehicle P.

Thereafter, the driver assistance control processor 11 may compare the visibility value Le with a preset visibility obstruction determination value Lo (Step S3). If the visibility value Le is less than or equal to the visibility obstruction determination value Lo (Le≤Lo) (Step S3: YES), the driver assistance control processor 11 may determine that the visibility obstruction has occurred, following which the flow may proceed to Step S4. In contrast, when the visibility value Le is greater than the visibility obstruction determination value Lo (Le>Lo) (Step S3: NO), the flow may exit the routine. The visibility obstruction determination value Lo may be a distance in which the driver is not able to easily recognize a vehicle traveling in front of the own vehicle M. In the example embodiment, the visibility obstruction determination value Lo may be set to, but not limited to, about 200 meters.

Thereafter, the driver assistance control processor 11 may cause the driver notification input-output unit 24 to notify the driver of the transition to the driver assistance mode against visibility obstruction (Step S4). The driver notification input-output unit 24 may notify the driver of the mode transition by outputting a sound from the speaker or displaying a notification on the monitor. When no cancelling operation is performed by the driver within a predetermined time (e.g., 0.5 to 1 second) (Step S5: YES), the driver assistance control processor 11 may execute the driver assistance mode against visibility obstruction (Step S6). In contrast, when the cancelling operation is performed by the driver within the predetermined time (Step S5: NO), the flow may exit the routine. The driver may perform the operation to cancel the driver assistance mode against visibility obstruction using the driver notification input-output unit 2.

After the driver assistance control processor 11 executes the driver assistance mode against visibility obstruction in Step S6, the flow may proceed to Step S7.

Figure 3:
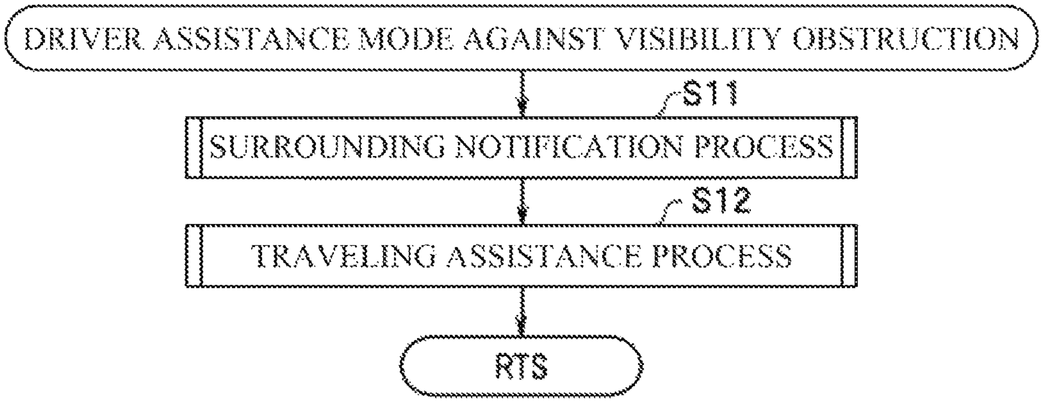
FIG. 3 is a flowchart of a sub-routine of a driver assistance mode against visibility obstruction according to one example embodiment of the disclosure.

The driver assistance mode against visibility obstruction may be executed according to a sub-routine illustrated in FIG. 3. In the sub-routine, the driver assistance control processor 11 may execute the surrounding notification process (Step S11) and the traveling assistance process (Step S12), following which the flow may proceed to Step S7 in FIG. 2.

Figure 4:
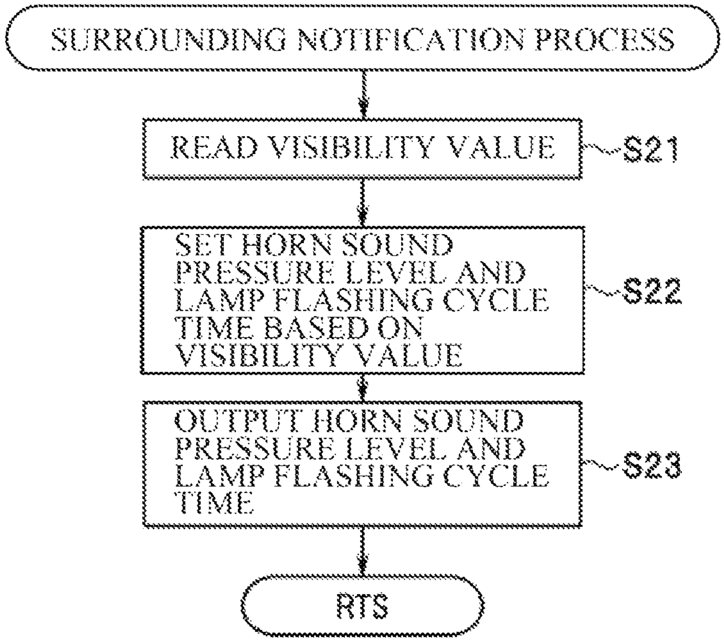
FIG. 4 is a flowchart of a sub-routine of a surrounding notification process according to one example embodiment of the disclosure.

The surrounding notification process executed by the driver assistance control processor 11 is a process adapted to notify the vehicles present around the own vehicle M of the presence of the own vehicle M. The surrounding notification process may be executed according to a sub-routine illustrated in FIG. 4. In the sub-routine, the driver assistance control processor 11 may read the visibility value Le measured in Step S2 (Step S21). Thereafter, the driver assistance control processor 11 may set a horn sound pressure and a flashing cycle time of the hazard lamp based on the visibility value Le (Step S22). The horn sound pressure may be determined referring to a sound pressure level table stored in the ROM in advance. The flashing cycle time of the hazard lamp may be determined referring to a flashing cycle table stored in the ROM in advance.

Figure 6:
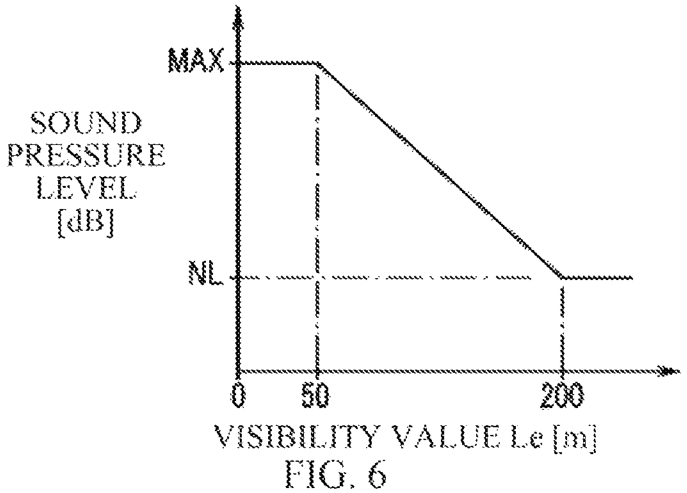
FIG. 6 is a conceptual diagram of a sound pressure level table according to one example embodiment of the disclosure.

FIG. 6 illustrates an exemplary concept of the sound pressure level table. The sound pressure level table may have a horizontal axis representing the visibility value Le [m], and a vertical axis representing the horn sound pressure level [dB]. According to the sound pressure table, the horn sound pressure level [dB] may increase as the visibility value Le [m] decreases. That is, the visibility obstruction may become greater as the visibility value Le [m] decreases, and a horn sound may be outputted at a higher sound pressure to notify the vehicles present around the own vehicle 100 of the presence of the own vehicle 100 as the visibility obstruction becomes greater. In the example embodiment, it may be determined that the visibility obstruction has occurred when the visibility value Le [m] is less than or equal to 200 [m], and the horn sound may be outputted at a maximum sound pressure level [dB] when the visibility value Le is 50 [m].

Figure 7A:
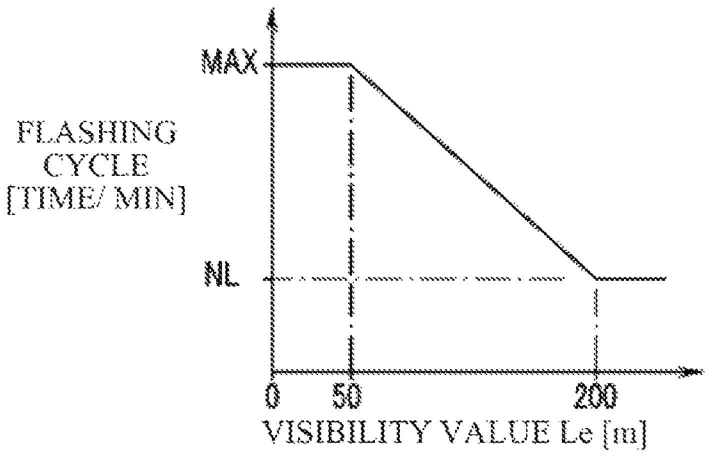
FIG. 7A is a conceptual diagram of a lamp flashing cycle table according to one example embodiment of the disclosure.
Figure 7B:
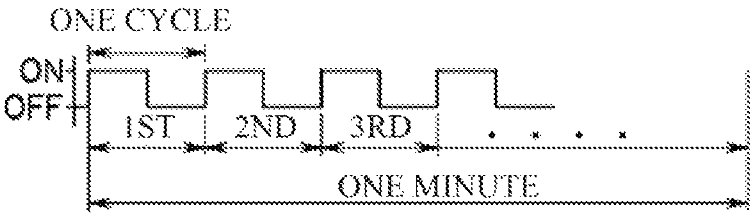
FIG. 7B is an explanatory diagram illustrating an exemplary flashing cycle according to one example embodiment of the disclosure.

FIG. 7A illustrates an exemplary concept of the flashing cycle table. The flashing cycle table may have a horizontal axis representing the visibility value Le [m], and a vertical axis representing the flashing cycle time (the number of flashing times per minute) of the hazard lamp. As illustrated in FIG. 7B, the flashing cycle table may indicate how many times of flashing are to be performed per minute provided that a single time of flashing of the hazard lamp corresponds to one flashing cycle.

According to the flashing cycle table, the flashing cycle per minute may increase as the visibility value Le [m] decreases. That is, flashing the hazard lamp may be repeated in a shorter time to make the vehicles present around the own vehicle M immediately recognize the presence of the own vehicle M as the visibility value Le [m] decreases. In the example embodiment, it may be determined that the visibility obstruction has occurred when the visibility value Le [m] is less than or equal to 200 [m], and the horn sound may be outputted in a maximum flashing cycle time (the number of flashing times per minute) when the visibility value Le is 50 [m].

Thereafter, the driver assistance control processor 11 may output command signals indicating the set horn sound pressure and the set lamp flashing cycle time to the horn drive unit 31 and the hazard lamp drive unit 32, respectively, following which the flow may proceed to Step S12.

The horn drive unit 31 may cause the horn to blow based on a drive signal indicating the horn sound pressure received from the driver assistance control processor 11. The hazard lamp drive unit 32 may cause each turn signal lamp Lt to flash based on a drive signal indicating the flashing cycle time received from the driver assistance control processor 11.

In Step S12, the driver assistance control processor 11 may determine whether the own vehicle M is traveling in a normal traveling direction along the traveling lane in the environment where the visibility obstruction has occurred. When the own vehicle M is traveling in a different direction from the normal traveling direction, the driver assistance control processor 11 may correct the traveling direction of the own vehicle M by performing steering intervention.

Figure 5:
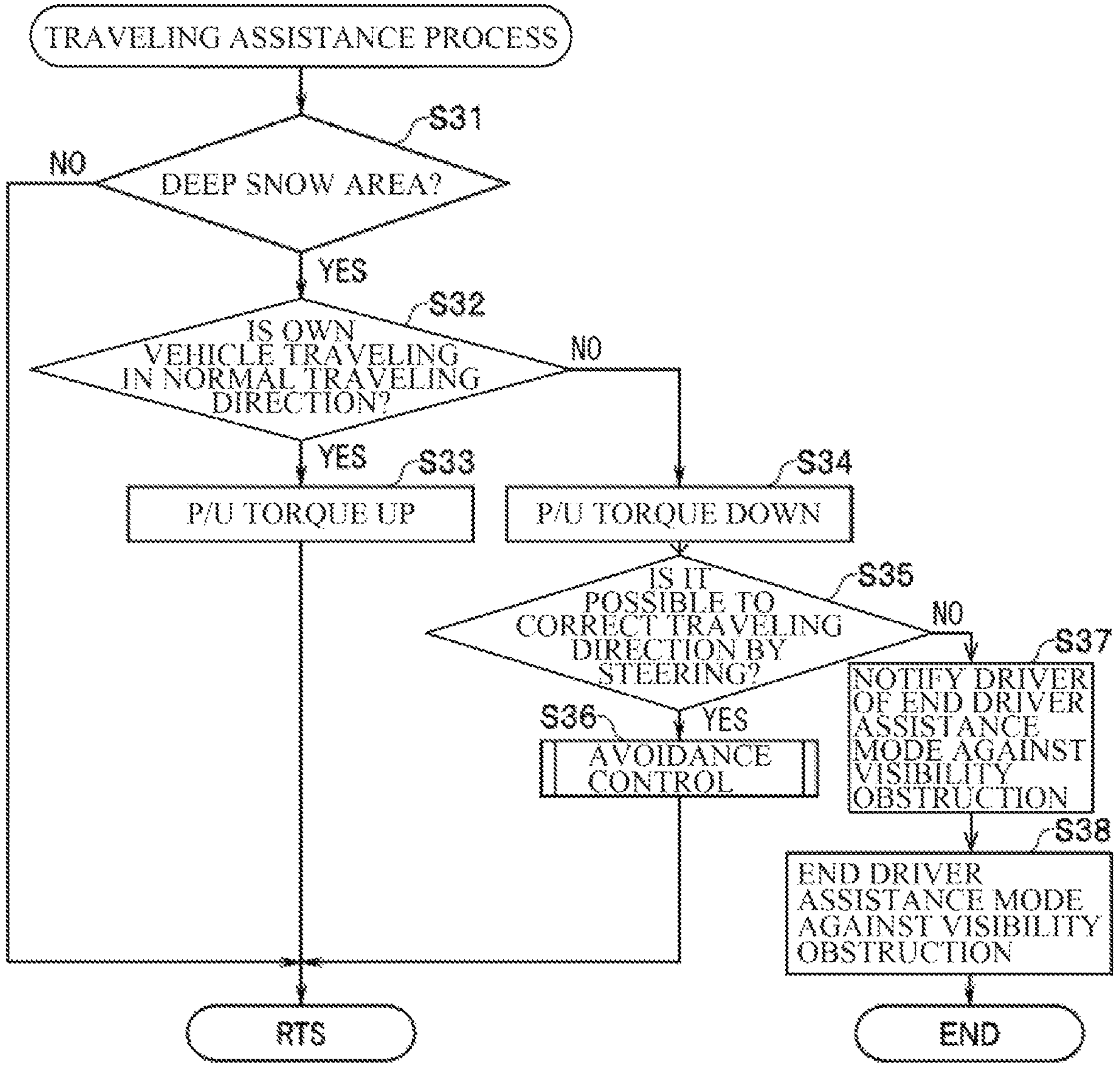
FIG. 5 is a flowchart of a sub-routine of a traveling assistance process according to one example embodiment of the disclosure.

The traveling assistance process at Step S12 may be executed according to a sub-routine illustrated in FIG. 5. First, the driver assistance control processor 11 may determine whether the own vehicle M has entered a deep snow area (Step S31). The term "deep snow area" used herein may refer to an area where snow is accumulated enough to apply a drag force to the own vehicle M but not enough to cause the own vehicle M to get stuck therein.

The driver assistance control processor 11 may determine whether the own vehicle M has entered a deep snow area based on an output from the power unit and an actual movement of the own vehicle M. The output from the power unit may be constantly calculated by the driver assistance control processor 11. The movement of the own vehicle M may be calculated based on a change in position of the own vehicle M determined based on the positioning signals from the positioning satellites.

The driver assistance control processor 11 may estimate the movement of the own vehicle M per unit time corresponding to the output of the power unit. Thereafter, the driver assistance control processor 11 may compare a difference ΔA between the estimated movement and an actual movement of the own vehicle M per unit time (=estimated movement−actual movement) with a preset allowable value Ao. When the difference ΔA is greater than or equal to the allowable value Ao (ΔA≥Ao) (Step S31: YES), the driver assistance control processor 11 may determine that the own vehicle M has entered the deep snow area. In contrast, when the difference ΔA is less than the allowable value Ao (ΔA<Ao) (Step S31: NO), the driver assistance control processor 11 may determine that the own vehicle M is traveling in a normal condition, following which the flow may exit the routine and proceed to Step S7.

When a frontal portion of the own vehicle M enters a snowbank, for example, the own vehicle M may be gradually decelerated by the drag force generated in the snowbank, so that the difference ΔA becomes greater than or equal to the allowable value Ao (ΔA≥Ao) even if the output from the power unit is constant. In addition, when the own vehicle M enters a snow wall area gradually bulging from the traveling lane toward a roadside, the own vehicle M may be gradually decelerated by the drag force generated in the snow wall area, so that the difference ΔA becomes greater than or equal to the allowable value Ao (ΔA≥Ao).

When the difference ΔA is greater than or equal to the allowable value Ao (ΔA≥Ao) (Step S31: YES), the flow may proceed to Step S32. In Step S32, the driver assistance control processor 11 may determine whether the own vehicle M is traveling in the normal traveling direction along the traveling lane. The driver assistance control processor 11 may determine whether the own vehicle M is traveling in the normal traveling direction along the traveling lane by identifying the traveling lane of the own vehicle M based on a current position of the own vehicle M retrieved from the high-resolution road map database 21*a* by the navigation system 21, and comparing the direction of the identified traveling lane with the traveling direction of the own vehicle M, for example. The traveling direction of the own vehicle M may be calculated from the change in position of the own vehicle M determined based on the positioning signals from the positioning satellites. The process at Step S32 may correspond to a process performed by a traveling direction detector according to one example embodiment of the disclosure.

Figure 9A:
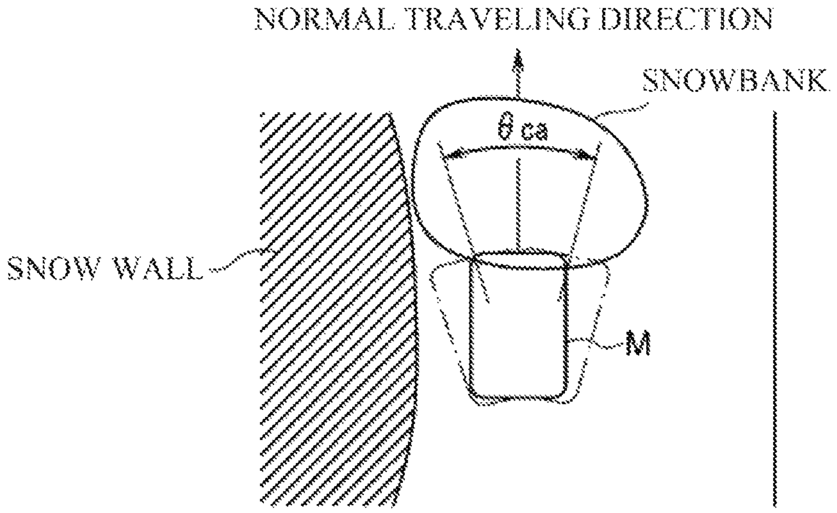
FIG. 9A is an explanatory diagram illustrating an own vehicle traveling in a normal traveling direction according to one example embodiment of the disclosure.

When the orientation of the own vehicle M is deviated from the normal traveling direction set along the traveling lane by an allowable angle θca/2 or less in a right and left directions as illustrated in FIG. 9A (Step S32: YES), the flow may proceed to Step S33. If the own vehicle M is decelerated while traveling in the normal traveling direction, it may be estimated that the deep snow area is a snowbank on the traveling lane. Note that the snowbank may include a recessed area in which snow is accumulated.

Figure 9B:
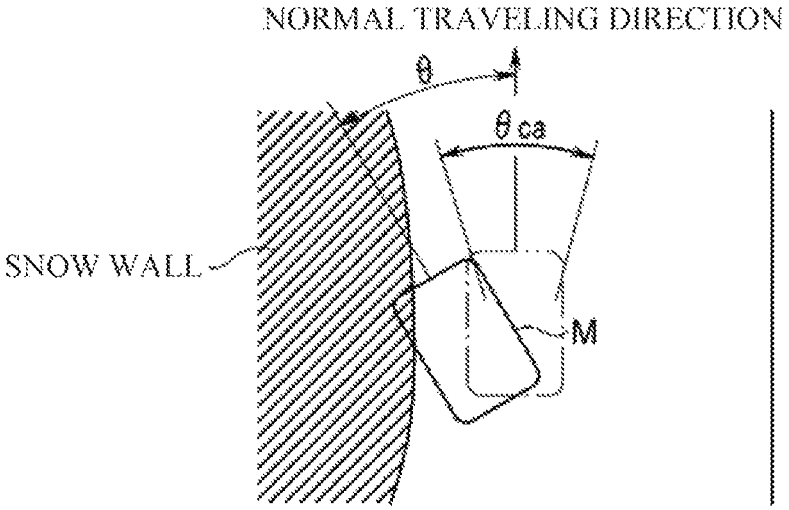
FIG. 9B is an explanatory diagram illustrating the own vehicle traveling in a direction deviated from the normal traveling direction according to one example embodiment of the disclosure.

When the orientation of the own vehicle M is deviated from the normal traveling direction set along the traveling lane by an angle θ which is greater than the allowable angle θca/2 set in the right and left directions as illustrated in FIG. 9B (Step S32: NO), the flow may branch to Step S34. When the orientation of the own vehicle M is deviated by the angle θ which is greater than the allowable angle θca/2, it may be estimated that the own vehicle M is traveling toward the roadside. Accordingly, it may be estimated that the own vehicle M has entered a bottom portion of the snow wall gradually bulging from the traveling lane toward the roadside.

In Step S33, the driver assistance control processor 11 may output a torque-up signal to the power drive unit 34, following which the flow may exit the routine. Based on the torque-up signal received from the driver assistance control processor 11, the power drive unit 34 may increase the torque of the power unit. When the torque of the power unit is increased, the own vehicle M may be caused to travel through the snowbank and keep traveling.

In contrast, in Step S34, the driver assistance control processor 11 may output a torque-down signal to the power drive unit 34, following which the flow may proceed to Step S35. Based on the torque-down signal received from the driver assistance control processor 11, the power drive unit 34 may decrease the torque of the power unit. As a result, the own vehicle M may be decelerated, which prevents the frontal portion of the own vehicle M from crashing into the bulging portion of the snow wall.

In Step S35, the driver assistance control processor 11 may determine whether it is possible to correct the traveling direction of the own vehicle M to the normal traveling direction by steering. If it is determined that it is possible to correct the traveling direction of the own vehicle M to the normal traveling direction by steering (Step S35: YES), the flow may proceed to Step S36. In contrast, if it is determined that it is difficult to correct the traveling direction of the own vehicle M to the normal traveling direction by steering (Step S35: NO), the flow may branch to Step S37.

The determination as to whether it is possible to correct the traveling direction of the own vehicle M to the normal traveling direction by steering may be made based on the height of a portion of the snow wall located in front of and near the bumper of the own vehicle M, the distance from the frontal portion of the own vehicle M to the snow wall, and the own vehicle speed detected by the vehicle speed sensor 25. While the own vehicle M is approaching the snow wall, the distance from the frontal portion of the own vehicle M to the snow wall may become shorter than the distance in which visibility obstruction is detected. Therefore, it is possible to measure the distance from the frontal portion of the own vehicle M to the snow wall based on the pixels of the image captured by the camera unit 23.

When it is determined that it is possible to correct the traveling direction of the own vehicle M by steering (Step S35: YES), the flow may proceed to Step S36. In contrast, when it is determined that it is difficult to correct the traveling direction of the own vehicle M by steering (Step S35: NO), the flow may proceed to Step S37.

In Step S36, the driver assistance control processor 11 may perform avoidance control by steering, following which the flow may proceed to Step S7. The driver assistance control processor 11 may perform the avoidance control by operating the EPS drive unit 33. Based on the height of the portion of the snow wall located in front of and near the bumper of the own vehicle M, the distance from the frontal portion of the driver assistance control processor 11 to the snow wall, and the own vehicle speed, the driver assistance control processor 11 may generate a target traveling route along which the own vehicle M will return to the normal traveling direction while avoiding contact with the snow wall. Thereafter, the driver assistance control processor 11 may send a steering signal corresponding to the target traveling route to the EPS drive unit 33. When receiving the steering signal, the EPS drive unit 33 may cause the EPS to operate so that the own vehicle M is guided to the normal traveling direction, as illustrated in FIG. 9B.

When the flow branches to Step S37, the driver assistance control processor 11 may drive the driver notification input-output unit 24 to notify that the own vehicle M will be stopped and the driver assistance mode against visibility obstruction will end. Thereafter, the driver assistance control processor 11 may end the driver assistance mode against visibility obstruction (Step S38), following which the routine may end.

When the flow proceeds from Step S31 or Step S36 to Step S7, the driver assistance control processor 11 may determine whether the visibility obstruction has been eliminated. In the example embodiment, it may be determined that the visibility obstruction has occurred when the visibility value Le is less than or equal to 200 [m]. Therefore, when the visibility value Le is greater than 200 [m], it may be determined that the visibility obstruction has been eliminated. If it is determined that the visibility obstruction still remains (Step S7: NO), the flow may return to Step S6. In contrast, if it is determined that the visibility obstruction has been eliminated (Step S7: YES), the flow may proceed to Step S8.

In Step S8, the driver assistance control processor 11 may drive the driver notification input-output unit 24 to notify the driver that the driver assistance mode against visibility obstruction will end, following which the flow may proceed to Step S9. The notification may be performed by means of a sound outputted from a speaker or displaying on a monitor, for example. If no operation to maintain the driver assistance mode against visibility obstruction is performed by the driver within a predetermined time period (e.g., from 0.5 to 1 second) (Step S9: YES), the driver assistance control processor 11 may end the driver assistance mode against visibility obstruction, following which the flow may exit the routine. In contrast, if the operation to maintain the driver assistance mode for visibility hinderance is performed by the driver using the driver notification input-output unit 24 within the predetermined time period, the flow may return to Step S6.

According to the example embodiment described above, when the visibility obstruction occurs, the driver assistance control processor 11 may notify the vehicles present around the own vehicle M of the presence of the own vehicle M by means of outputting a horn sound or lighting the hazard lamp, for example. The sound pressure of the horn sound and the flashing cycle time of the hazard lamp may be controlled based on the visibility value Le. For example, the sound pressure of the horn sound may be increased as the visibility value Le decreases, and the flashing cycle time of the hazard lamp may be shortened as the visibility value Le decreases. Accordingly, it is possible to easily notify the vehicles or the like present around the own vehicle M of the presence of the own vehicle M depending on the degree of the visibility obstruction.

In addition, when the frontal portion of the own vehicle M oriented in the normal traveling direction enters the deep snow area when the visibility obstruction occurs, the driver assistance control processor 11 may torque up the power unit so that the own vehicle M travels through the deep snow area. When the orientation of the own vehicle M is deviated from the normal traveling direction, the driver assistance control processor 11 may torque down the power unit so that the own vehicle M is decelerated to avoid contact with the snow wall. In this case, the driver assistance control processor 11 may perform the avoidance control by steering in addition to the torque-down of the power unit. Accordingly, it is possible to secure the traveling of the own vehicle M even in the environment where the visibility obstruction has occurred.

Note that the disclosure is not limited to the above-described example embodiments. For example, the driver assistance control processor 11 may execute either one of the surrounding notification process and the traveling assistance process as the driver assistance mode against visibility obstruction.

According to the example embodiments of the disclosure described above, when it is determined that the visibility obstruction has occurred, one or both of the surrounding notification process and the traveling assistance process that are set as the driver assistance mode against visibility obstruction are executed. The surrounding notification process is a process adapted to notify the vehicles or the like present around the own vehicle of the presence of the own vehicle depending on the visibility value. The traveling assistance process is a process adapted to assist a traveling state of the own vehicle. Accordingly, it is possible to easily notify the vehicles or the like present around the own vehicle of the presence of the own vehicle depending on the degree of the visibility obstruction and to perform effective driver assistance even when the visibility obstruction has occurred.

The invention claimed is:

1. A driver assistance apparatus to be applied to a vehicle, the driver assistance apparatus comprising:

an environment information obtainer configured to acquire information on a traveling environment around the vehicle;

a visibility value measurer configured to measure, as a visibility distance, a distance over which vehicle surroundings are visible based on the information on the traveling environment acquired by the environment information obtainer;

a traveling direction detector configured to detect a traveling direction of the vehicle; and a control processor configured to:

determine that a visibility-obstructed condition of the vehicle surroundings has occurred when the measured visibility distance is less than or equal to a predetermined threshold visibility distance;

execute, when the visibility-obstructed condition has occurred, (1) a first process in which the control processor provides an alert perceivable by nearby vehicles to indicate presence of the vehicle by causing at least one of a horn or a turn signal lamp of the vehicle to output the alert based on the measured visibility distance; and (2) a second process in which the control processor assists traveling of the vehicle by adjusting at least one of torque of a power unit or steering of the vehicle;

increase torque of the power unit of the vehicle in the second process when it is determined that the traveling direction of the vehicle detected by the traveling direction detector is oriented in a direction along a traveling lane of the vehicle;

decrease the torque of the power unit of the vehicle in the second process when it is determined that the traveling direction of the vehicle detected by the traveling direction detector is oriented in a direction different from the direction along the traveling lane;

determine that the vehicle has entered a deep snow area when a difference between an estimated movement of the vehicle per unit time and an actual movement of the vehicle per unit time is greater than or equal to a preset allowable value;

increase the torque of the power unit when the vehicle has entered the deep snow area and the traveling direction of the vehicle is oriented in the direction along the traveling lane of the vehicle; and decrease the torque of the power unit when the vehicle has entered the deep snow area and the traveling direction of the vehicle is oriented in the direction different from the direction along the traveling lane.

2. The driver assistance apparatus according to claim 1, wherein the control processor is configured to set a sound pressure level of the horn of the vehicle to a value that varies depending on the measured visibility distance in the first process.

3. The driver assistance apparatus according to claim 1, wherein the control processor is configured to set a flashing cycle time of the turn signal lamp of the vehicle to a value that varies depending on the measured visibility distance in the first process.

4. The driver assistance apparatus according to claim 1, wherein the control processor is configured to execute avoidance control adapted to return the traveling direction of the vehicle to the direction along the traveling lane when the torque of the power unit is decreased in the second process.

5. The driver assistance apparatus according to claim 1, wherein the environment information obtainer comprises a camera unit, and the visibility value measurer is configured to extract, from an image captured by the camera unit, a part having a contrast difference greater than or equal to a predetermined value and measure the visibility distance based on a distance to the extracted part.

6. The driver assistance apparatus according to claim 1, wherein, in the first process, the control processor is configured to:

set a sound pressure level of the horn to increase as the measured visibility distance decreases;

set a flashing cycle time of the turn signal lamp such that a number of flashes per minute of the turn signal lamp increases as the measured visibility distance decreases; and cause the horn and the turn signal lamp to output the alert according to the set sound pressure level and the set flashing cycle time.

7. A driver assistance apparatus to be applied to a vehicle, the driver assistance apparatus comprising circuitry configured to:

acquire information on a traveling environment around the vehicle;

measure, as a visibility distance, a distance over which vehicle surroundings are visible based on the information on the traveling environment;

determine that a visibility-obstructed condition of the vehicle surroundings has occurred when the measured visibility distance is less than or equal to a predetermined threshold visibility distance;

execute, when the visibility-obstructed condition has occurred, (1) a first process in which the circuitry provides an alert perceivable by nearby vehicles to indicate presence of the vehicle by causing at least one of a horn or a turn signal lamp of the vehicle to output the alert based on the measured visibility distance; and (2) a second process in which the circuitry assists traveling of the vehicle by adjusting at least one of torque of a power unit or steering of the vehicle;

detect a traveling direction of the vehicle;

increase torque of the power unit of the vehicle in the second process when it is determined that the traveling direction of the vehicle is oriented in a direction along a traveling lane of the vehicle;

decrease the torque of the power unit of the vehicle in the second process when it is determined that the traveling direction of the vehicle is oriented in a direction different from the direction along the traveling lane;

determine that the vehicle has entered a deep snow area when a difference between an estimated movement of the vehicle per unit time and an actual movement of the vehicle per unit time is greater than or equal to a preset allowable value;

increase the torque of the power unit when the vehicle has entered the deep snow area and the traveling direction of the vehicle is oriented in the direction along the traveling lane of the vehicle; and decrease the torque of the power unit when the vehicle has entered the deep snow area and the traveling direction of the vehicle is oriented in the direction different from the direction along the traveling lane.

8. The driver assistance apparatus according to claim 7, wherein the circuitry is configured to set a sound pressure level of the horn of the vehicle to a value that varies depending on the measured visibility distance in the first process.

9. The driver assistance apparatus according to claim 7, wherein the circuitry is configured to set a flashing cycle time of the turn signal lamp of the vehicle to a value that varies depending on the measured visibility distance in the first process.

10. The driver assistance apparatus according to claim 7, wherein the circuitry is configured to execute avoidance control adapted to return the traveling direction of the vehicle to the direction along the traveling lane when the torque of the power unit is decreased in the second process.

11. The driver assistance apparatus according to claim 7, wherein the information on the traveling environment comprises an image captured by a camera unit, and the circuitry is configured to:

extract, from the image, a part having a contrast difference greater than or equal to a predetermined value; and measure the visibility distance based on a distance to the extracted part.

12. The driver assistance apparatus according to claim 7, wherein, in the first process, the circuitry is configured to:

set a sound pressure level of the horn to increase as the measured visibility distance decreases;

set a flashing cycle time of the turn signal lamp such that a number of flashes per minute of the turn signal lamp increases as the measured visibility distance decreases; and cause the horn and the turn signal lamp to output the alert according to the set sound pressure level and the set flashing cycle time.

* * * * *